UNITED STATES PATENT OFFICE.

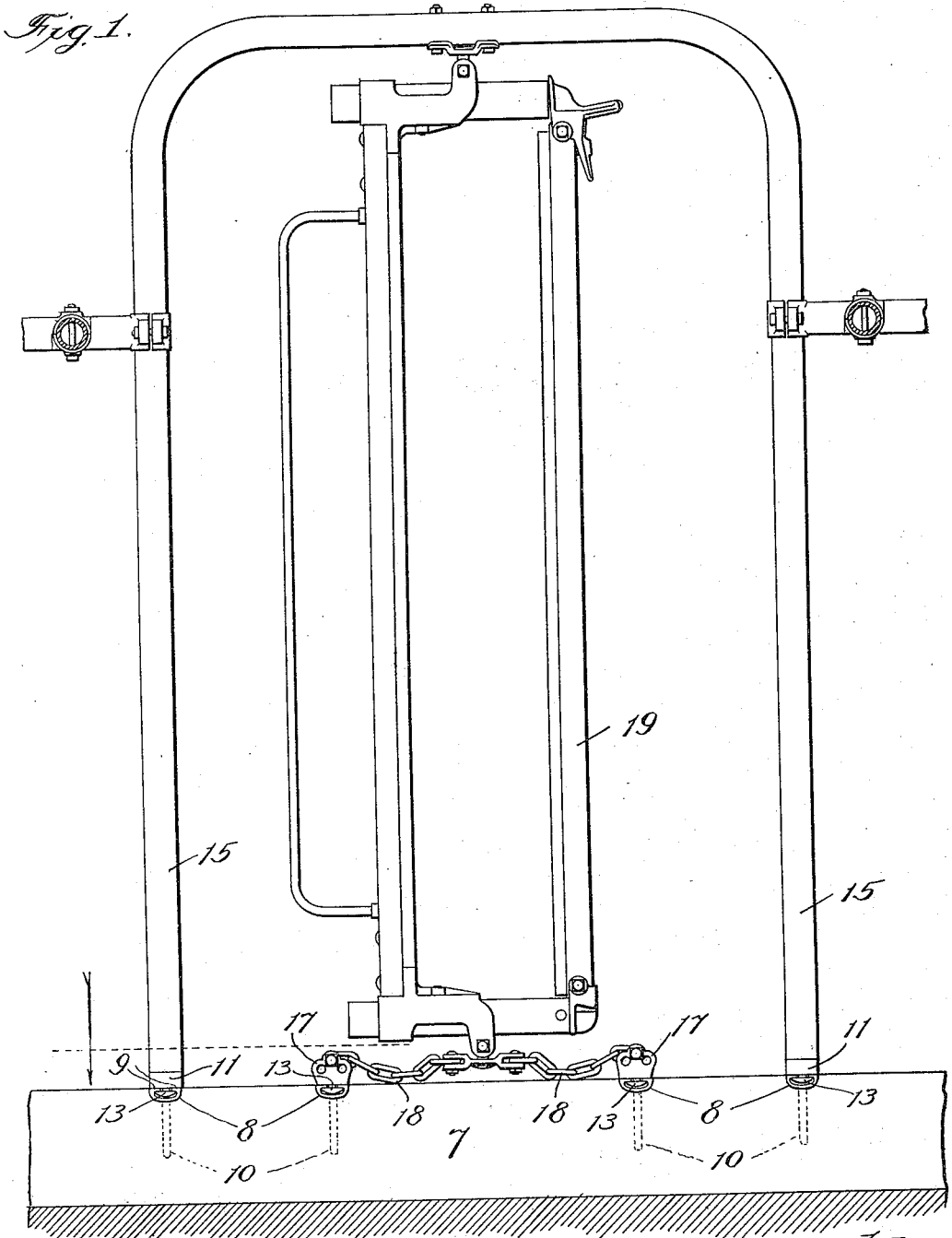

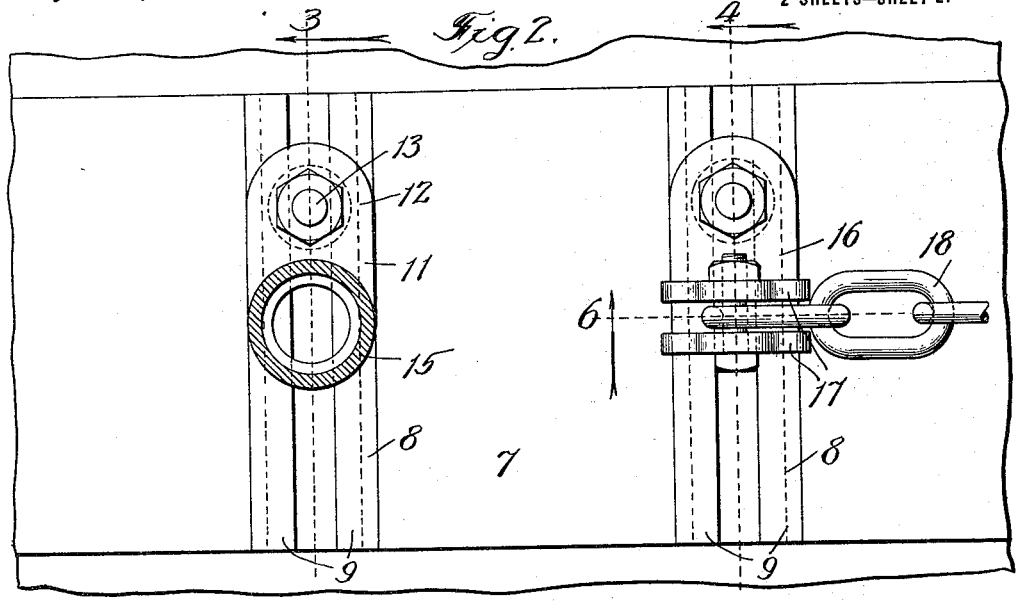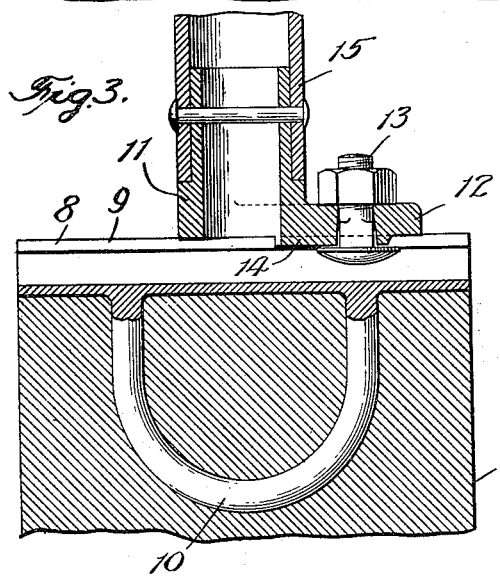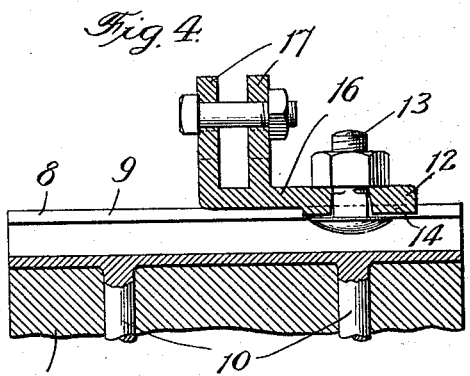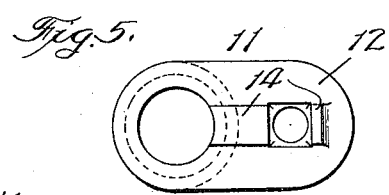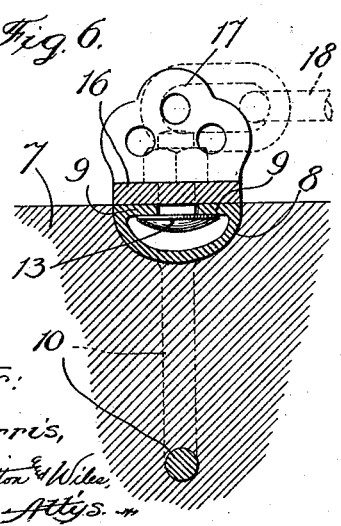

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

STALL CONSTRUCTION.

1,145,474.     Specification of Letters Patent.     Patented July 6, 1915.

Application filed February 16, 1914. Serial No. 818,953.

*To all whom it may concern:*

Be it known that I, HENRY L. FERRIS, a citizen of the United States, residing at Harvard, in the county of McHenry and State of Illinois, have invented a new and useful Improvement in Stall Constructions, of which the following is a specification.

My invention relates to certain new and useful improvements in stall constructions, and is fully described and explained in the specification and shown in the accompanying drawings, in which:—

Figure 1 is a front elevation of my improved device; Fig. 2 is a section on the line 2 of Fig. 1; Fig. 3 is a section on the line 3 of Fig. 2; Fig. 4 is a section on the line 4 of Fig. 2; Fig. 5 is a bottom plan of one of the castings attached to the frame, and Fig. 6 is a section on the line 6 of Fig. 2.

Referring to the drawings, 7 is the curb at the front of the stall. Set in this curb, and preferably extending from one face thereof to the other, are four channel-shaped members 8 open at the top and flush with the top of the curb. These members have their upper edges turned in to form flanges 9 and are provided at their bottoms with loops 10 to give them a firm seat in the concrete. The two lateral members 8 are surmounted by castings 11, each of which has at its lower end an extension 12, perforated to receive a bolt 13, the head of which lies in the corresponding channel-shaped member and is held in place by engagement with the lower surfaces of the flanges thereof. The extensions of the members 11 are provided with downwardly projecting ribs 14 lying in the space between the flanges to prevent rotation of the castings 11. The castings 11 are attached to the lower ends of a stall frame 15, the upper end of which is suitably supported in any desired manner, and the frame being afforded by its engagement with the channel member, a capacity for adjustment on the curb and therefore longitudinal of the stall. The castings 11 can, if desired, be turned around so that the stall can be adjusted the entire width of the curb, this being enough to accommodate the stall to animals of all the sizes which are likely to be placed therein.

The intermediate channel-shaped members receive and hold castings 16, the lower parts of which are exactly the same as those of the castings 11 heretofore described and which are held in and adjustable along this corresponding channel-shaped member in the same manner. The castings 16, however, have upwardly-extending ears 17 to engage chains 18 which form the securing means for the lower part of a stanchion 19 mounted in the stall-frame. By this arrangement the lower end of the stanchion can be adjusted to correspond with the position of the stall-frame. If it be desired to use the stanchion with a single chain, or a single pivot, of course, one of the channel-shaped members 8 would be omitted and the single remaining one placed centrally of the stall.

The arrangement thus described possesses several advantages. In the first place the stalls can be erected one at a time as desired, nothing being placed in the barn in the beginning but the channel-members in the curb. The stalls are readily adjustable, and by using this arrangement their adjustment is accomplished at a lower cost than is required when other arrangements are adopted. In this form of construction it will be noted that the bottom bar of the stall-frame is omitted, the curb being made to serve the purpose without substantially adding to the expense of construction. Therefore, the cost of the bottom bar of a stall-frame, together with its fitting in place, is eliminated.

I realize that considerable variation is possible in the details of the construction herein shown, and I do not intend to limit myself thereto, except as pointed out in the following claims, in which it is my intention to claim all the novelty inherent in the device as broadly as the state of the art will permit.

What I claim as new and desire to secure by Letters Patent is:

1. In combination, a concrete curb positioned at the front of a cattle stall, transverse and intermediate way forming members embedded in the curb, members forming part of a stall frame adapted for adjustment in the outer of said way forming members, uprights secured to said adjustable members whereby the frame may be moved longitudinally of the stall and a stanchion carried by the uprights and connected with said intermediate member whereby it may be adjusted longitudinally with said uprights.

2. In combination, a curb at the front of a cattle stall, lateral and intermediate members set transversely in the curb, uprights forming part of a stall-frame adjustably secured to the lateral members, a stanchion carried by the frame and adjustably secured to the intermediate members.

3. In combination, a curb at the front of a cattle stall, lateral and intermediate members set transversely in the curb, a stall-frame consisting of lateral uprights connected at the top by a bar and unconnected at the bottom, a stanchion carried by the bar, the lateral uprights of the stall-frame being adjustable upon the lateral members, and the stanchion upon the intermediate members, for the purpose set forth.

4. In combination, a concrete curb positioned at the front of a cattle stall, a stall frame, channel-shaped members having inturned flanges embedded in said curb and extending transversely thereof, bolts whose heads lie beneath the flanges of said embedded members and which project upwardly therefrom, L-shaped members carried by said bolts, uprights forming part of the stall frame, and a stanchion carried thereby, said uprights and stanchion being adapted to be secured to said L-shaped members whereby said uprights and stanchion may be adjusted longitudinally.

5. In combination, a curb at the front of a cattle stall, lateral and intermediate channel-shaped members having inturned flanges set in the curb, bolts having their heads beneath the flanges projecting therefrom, uprights forming part of the stall-frame, a stanchion in the frame, the uprights being secured to the bolts carried by the lateral channel-shaped members, and the stanchion to the intermediate bolts.

6. In combination, a curb at the front of a cattle stall, two lateral and two intermediate members set transversely thereof, uprights and a top-bar forming a stall-frame and adjustably secured to the lateral members, a stanchion hung from the top-bar of the frame, two chains connected to the lower end of the stanchion and extending therefrom in opposite directions and adjustably secured to the two intermediate members.

In testimony whereof I have hereunto set my hand this 4th day of February, 1914.

HENRY L. FERRIS.

In presence of two subscribing witnesses:
 Wm. A. Mueller,
 A. Leadbitter.

Copies of this patent may be obtained for five cents each, by addressing the "Commissioner of Patents, Washington, D. C."